(12) United States Patent
Biby

(10) Patent No.: US 8,620,304 B2
(45) Date of Patent: Dec. 31, 2013

(54) SYSTEMS AND METHODS FOR DETERMINING POTENTIAL LOCATIONS FOR NEW CELLULAR TRANSMITTER SITES

(75) Inventor: Richard P. Biby, Waterford, VA (US)

(73) Assignee: SquareLoop, Inc., Great Falls, VA (US)

(*) Notice: Subject to any disclaimer, the term of this patent is extended or adjusted under 35 U.S.C. 154(b) by 878 days.

(21) Appl. No.: 11/866,599

(22) Filed: Oct. 3, 2007

(65) Prior Publication Data

US 2008/0085714 A1    Apr. 10, 2008

Related U.S. Application Data

(60) Provisional application No. 60/827,903, filed on Oct. 3, 2006.

(51) Int. Cl.
| H04W 24/00 | (2009.01) |
| H04W 40/00 | (2009.01) |
| H04B 1/00 | (2006.01) |
| H04B 17/00 | (2006.01) |

(52) U.S. Cl.
USPC ....... 455/424; 455/423; 455/63.1; 455/67.11; 455/446

(58) Field of Classification Search
USPC .............. 455/423, 424, 63.1, 67.11, 446
See application file for complete search history.

(56) References Cited

U.S. PATENT DOCUMENTS

| 6,750,813 B2 | 6/2004 | Vargas-Hurlston et al. |
| 7,272,121 B2 * | 9/2007 | Wilkes et al. ................. 370/331 |
| 2002/0098851 A1 | 7/2002 | Walczak et al. |
| 2005/0197124 A1 * | 9/2005 | Kang et al. ..................... 455/439 |
| 2006/0128372 A1 * | 6/2006 | Gazzola ........................ 455/424 |

OTHER PUBLICATIONS

International Search Report, PCT application No. PCT1US2006/047352 (Sep. 23, 2008).
International Preliminary Report on Patentability, PCT application No. PCT/US2006/047352 (Oct. 23, 2008).

* cited by examiner

*Primary Examiner* — Wesley Kim
(74) *Attorney, Agent, or Firm* — Nixon & Vanderhye P.C.

(57) ABSTRACT

This technology herein relates to methods and systems for determining cellular and other radio transmitter mappings based upon calculated and actual values. Cellular and other radio transmitter mappings are calculated based upon factors including transmitter locations, projected signal strength maps, and signal strength measurements. This technique can be used to determine prospective and actual locations of communications towers, and which communications providers would be interested in leasing space on those towers.

11 Claims, 3 Drawing Sheets

SYSTEMS AND METHODS FOR DETERMINING POTENTIAL LOCATIONS FOR NEW CELLULAR TRANSMITTER SITES

CROSS-REFERENCES TO RELATED APPLICATIONS

This application claims the benefit of U.S. Provisional Application No. 60/827,903, filed Oct. 3, 2006, the entire contents of which is hereby incorporated by reference.

FIELD

The technology herein relates to methods and systems for determining cellular and other radio transmitter mappings. More particularly, the technology herein provides methods and systems which enable the calculation of cellular and other radio transmitter mappings based upon factors including transmitter locations, projected signal strength maps, and signal strength measurements. The methods and systems provided by exemplary illustrative non-limiting implementations are useful for determining potential locations of new communications towers, and predicting which communications providers would be interested in leasing space on those towers. The technology herein thus has applications in the fields of electronics, computing, and telecommunications.

BACKGROUND AND SUMMARY

Cellular operators often rely on maps of cellular signal strength calculated on the basis of signal propagation theory, terrain, tower location, and transmitter power. These calculations are sometimes imprecise and result in locations being erroneously reported as having acceptable signal levels when actual coverage is inadequate. These deficiencies can lead to poor signal quality, which results in cellular users complaining about bad call quality and dropped calls. Cellular operators thus have a strong interest in determining where their cellular signals are weak. They often will install additional transmitters, at additional expense and effort, to provide better signal coverage.

A map that associates cellular transmitters, cellular operators, and signal strength by cellular operator is often not readily available using current estimation methods. Nevertheless, enterprising third-party tower owners often attempt to obtain land and construct towers. Often, they attempt to purchase land and sometimes construct a radio tower before cellular operators determine that they have a signal quality problem that requires an additional transmitter. Such third parties thus are in a position to lease tower or other radio transmitter locations to cellular operators, providing a return on investment and better service to cellular customers.

Thus, there is an urgent need for better methods and systems to estimate signal strength for cellular and other radio signals. The technology herein meets these and other needs.

In one aspect, the exemplary illustrative non-limiting technology herein provides methods to estimate the location of at least one cellular transceiver tower used by a cellular telephone carrier. In another aspect, the exemplary illustrative non-limiting technology herein provides methods to estimate a network or sub-network of cellular transceiver towers used by a cellular telephone carrier.

BRIEF DESCRIPTION OF THE DRAWINGS

These and other features and advantages will be better and more completely understood by referring to the following detailed description of exemplary non-limiting illustrative implementations in conjunction with the drawings of which.

DETAILED DESCRIPTION

An exemplary illustrative non-limiting implementation provides methods and systems for determining cellular signal strength in a geographical location. A non-limiting exemplary implementation includes the following operations:

Steps

Figure 3:
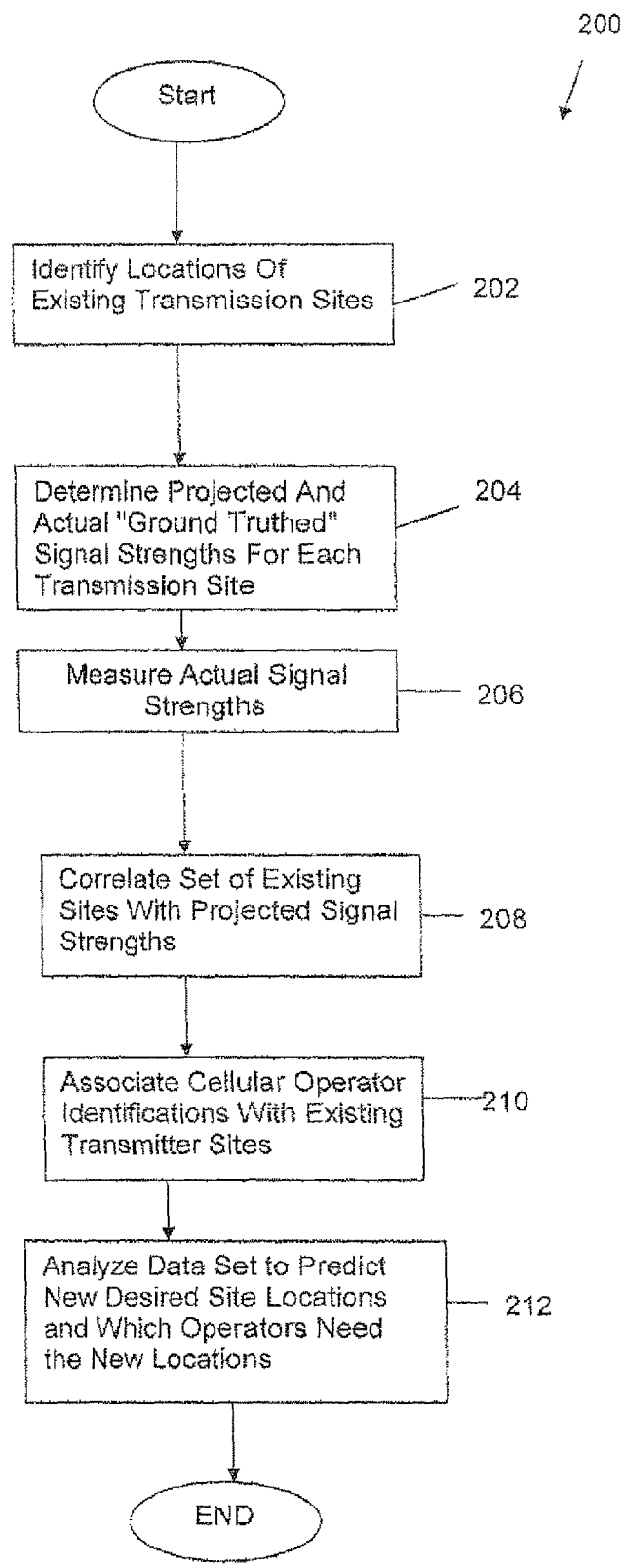
FIG. 3 is an exemplary illustrative non-limiting system.

An initial step identifies locations of existing cellular towers and transmitters (FIG. 3 block 202). The set of identified existing cellular towers and transmitters is called T(x) below. The set of identified cellular towers can be commercially obtained in various databases of cellular towers and locations and/or by observation.

The exemplary illustrative implementation then determines the projected signal strength for each transmitter in T(x) at one or more locations L(i), to produce a set of projected signal strengths according to each tower and location (FIG. 3 block 204). The set of projected strengths is referred to below as P(T(x), L(i)). Various models and calculations can be used to estimate the signal strength around a tower or other transmitter. One example of such as model is the well-known Longley-Rice model, which approximates signal strength at a specific location to within +/− 10 dB.

Actual signal strength may range in value depending upon the distance and terrain between the transmitter (tower) and the measurement location. Expected values are in the −40 dBm to −100 dBm range, where −40 dBm is present at the transmitter (tower) and −100 dBm may be at the minimum level for a usable signal.

The measuring equipment and predictive modeling software is, in one exemplary illustrative non-limiting implementation, "ground truthed" before starting measurements using this algorithm. Ground truthing is a process by which the several known locations and cellular transmitters/towers are measured to determine the correlation between the actual transmission strength from specific cellular transmitters/tower and the projected transmission strength using the preferred model. In some cases, a plurality of models may be used and the measurements cross-correlated between them.

For each location L(i), the exemplary illustrative non-limiting implementation identifies the projected signal strength for each transmitter with a projected non-zero signal strength, and measures the actual signal strength, transmitter identification, and cellular operator information attributes for each non-zero signal at location L(i) (block 206). This yields a set of signals, their strengths, their associated transmitter ID, and other information about each signal. This set is called S(j, L(i)) below.

One example illustrative non-limiting implementation then associates S(j, L(i)) with T(x) using P(T(x), L(i)) to make a correlation (block 208). The exemplary illustrative non-limiting implementation then associates cellular operator information attributes from S(j, L(i)) with tower T(x) to determine coverage by cellular operator (block 210). In one example illustrative non-limiting implementation, the correlation will occur when the difference between the actual measurement and P(T(x), L(i)) is +/−6 dBm.

Results

The resulting set of associations of cellular operators with towers T(x) provides useful information about:

where each cellular operator might want to lease tower space to fill in low signal strength areas.

the existing cellular infrastructure, allowing companies to identify locations where specific operators may wish to locate additional transmitters on existing towers (block 212).

An example illustrative non-limiting system 100 includes a processor 102 programmed with signal strength modeling software. The processor 102 has access to a database 104 of cellular telephone site information including cellular telephone operators. Local or remote receiver(s) 110 coupled to antennas 112 can measure actual signal strength. An input device 108 inputs collected data, and a display 106 or other output device displays results.

Example

Figure 1:
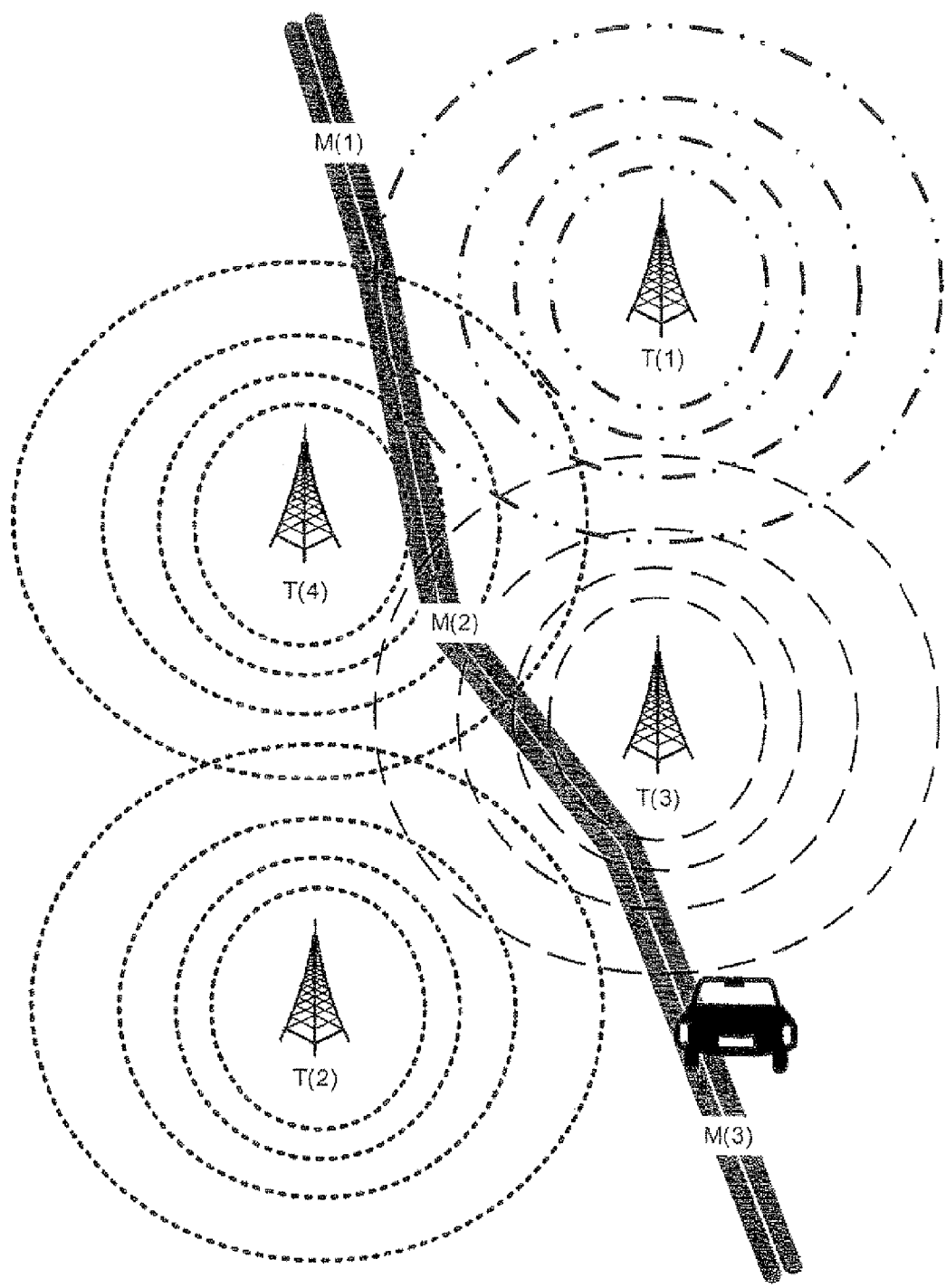
FIG. 1 is an exemplary illustrative non-limiting example use of an algorithm that projects signal strength indicated by bands surrounding towers.
Figure 2:
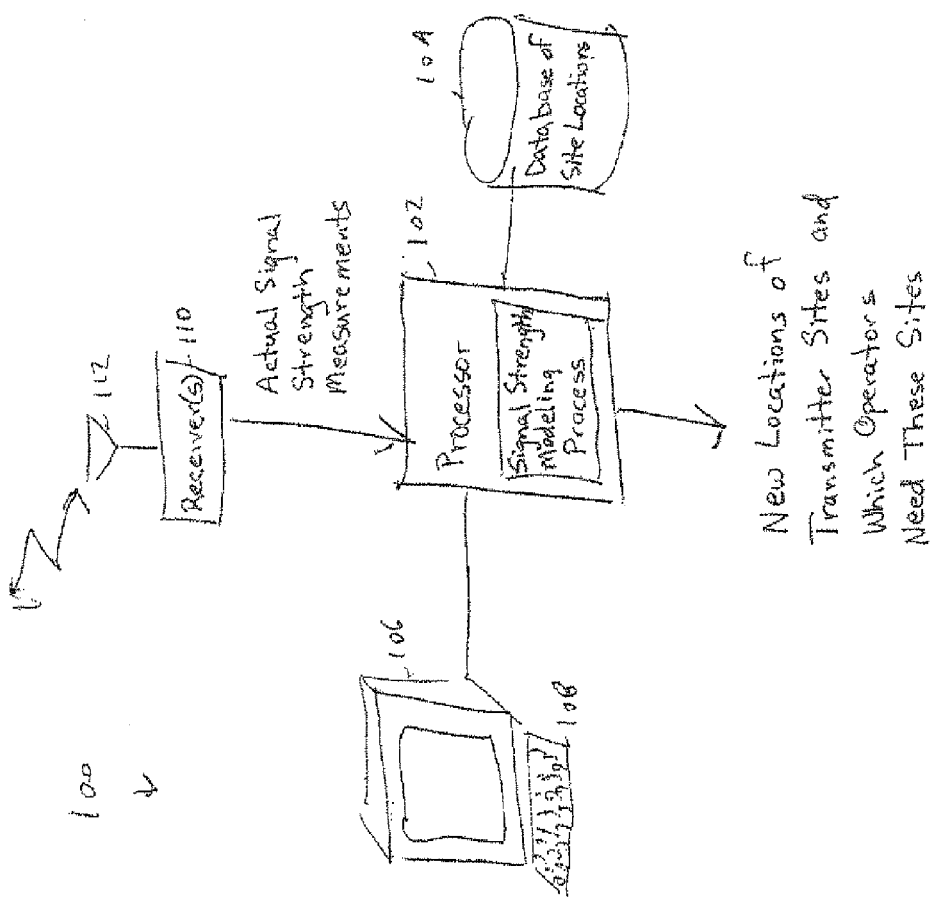
FIG. 2 is an exemplary illustrative non-limiting flowchart.

FIG. 1 illustrates an example use of the algorithm when applied using a set of towers T(x), with projected signal strength indicated by bands surrounding towers T(x). Each band represents the set of points L(i), such that the values of P(T(x), L(i)) for each point L(i) are approximately equal.

Points M(1), M(2), and M(3) represent three example actual measurements at locations L(M(1)), L(M(2)), L(M(3)). The table below presents these example measurements:

| Location | Estimated T(1)<br>P(T(1), L(M(1)) | Estimated T(2)<br>P(T(2), L(M(2)) | Estimated T(3)<br>P(T(3), L(M(3)) | Actual Measurement(s) |
|---|---|---|---|---|
| L(M(1)) | −73 dBm | 0 | 0 | Cingular 123 - −70 dBm |
| L(M(2)) | −71 dBm | −76 dBm | −96 dBm | Cingular 123 - −70 dBm<br>T-Mobile 456 - −81 dBm<br>Verizon 789 - −102 bDm |
| L(M(3)) | 0 | 0 | −65 dBm | Vertzon 789 - −66 dBm |

Based upon the above information, we can correlate the non-zero P(T(i), L(M(j)) with the actual readings to determine T(1) is likely Cingular transmitter #123, T(2) is likely T-Mobile transmitter #456, and T(3) is likely Verizon transmitter #789. Furthermore, we can conclude that both T-Mobile and Verizon would be candidates to lease tower space on Tower T(1), and that both Cingular and T-Mobile would be candidates to lease tower space on Tower T(3) in order to complete their coverage of the area. Furthermore, after correlation, we can determine that location T(4) would be an advantageous location to construct a tower and offer to lease space on it to Verizon because the coverage from T(4) for Verizon would save them having to place transmitters on either T(1) or T(2).

It should be noted that the example has been simplified to facilitate understanding. In normal usage, each tower generally has a plurality of transmitters from a plurality of vendors, and each location will have a plurality of transmitters from each vendor visible.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

I claim:

1. Using (a) at least one computing device including a processor, and (b) at least one RF receiver for receiving and measuring RF signals, a method of deducing which telecommunications equipment site is likely to have transmitted the received and measured RF signals, comprising:

(a) using said at least one RF receiver, measuring RF signals to provide a set S of ground-truthed RF signals for each of a plurality of locations L(i);

(b) using said computing device processor to compute RF propagation from a plurality of identified telecommunications equipment sites T(x) based on a predictive model for the plurality of locations L(i), the computed predictive model comprising a set of predicted RF propagation values P(T(x), L(i)); and (c) correlating the set S of ground-truthed RF signals for location L(i) with the set of predicted RF propagation values P(T(x), L(i)) to deduce which of the plurality of identified telecommunications equipment sites T(x) is likely to have transmitted the measured RF signals.

2. The method of claim 1 wherein said plurality of identified telecommunications equipment sites T(x) comprise cellular telephone transceiver sites.

3. The method of claim 1 wherein said set of predicted RF propagation values comprise RF signal strength, transmitter identification and other information.

4. The method of claim 1 wherein said correlating includes determining whether differences between the ground-truthed measured RF signals and the predicted RF propagation values are within a predetermined discrepancy.

5. The method of claim 1 further including using the correlating to predict sites where communications system providers may wish to locate additional telecommunications equipment sites.

6. A method of determining a potential location for an additional telecommunications equipment site, the method comprising:

(a) predicting RF signal strength by using at least one computer including a processor to compute predictive model of the RF signal strength that would be received from existing telecommunications equipment sites;

(b) using at least one radio receiver to measure and record a set of ground-truthed RF signal strength values at a plurality of locations;

(c) using the processor, correlating the predicted RF signal strength with the measured set of ground-truthed RF signal strength values at the plurality of locations to identify which existing telecommunications equipment sites transmitted the measured RF signal; and (d) using the identification of which existing telecommunications equipment sites transmitted the measured RF signal to determine an additional advantageous telecommunications equipment location.

7. The method of claim 6 further including determining, based on the determined identification of which existing telecommunications equipment sites transmitted the measured RF signal, where to install additional telecommunications equipment.

8. The method of claim 6 further including providing set of associations of cellular operators with existing telecommunications equipment sites to identify locations where operators may wish to locate additional telecommunications equipment.

9. The method of claim 6 further including using the determined identification of which existing telecommunications equipment sites transmitted the measured RF signal to predict locations where telecommunications operators may desire to locate additional telecommunications equipment to provide additional service.

10. A system for exploring wireless transceiving sites, the system comprising:
   a computer including a processor connected to a storage device to automatically model RF signal strength profiles based on location and localized topographic features, the computer executing instructions that automatically generate a set of projected RF signal strength profiles for plural sites where wireless transceiving equipment may be located;
   a mobile radio receiver configured to measure transmitted RF signals and report, to the computer processor, a set of measured ground-truthed signal strength values of RF signals transmitted by the wireless transceiving equipment;
   the computer processor being configured to automatically correlate received and predicted RF signal strength to calculate a number of potential locations that could be transmitting until the most likely transmitting location is determined.

11. A system for computing which telecommunications equipment site is likely to have transmitted the measured RF signals, comprising:
   at least one RF receiver for receiving and measuring RF signals to provide a set S of ground-truthed RF signals for each of a plurality of locations $L(i)$; and
   at least one computing device including a processor arranged to obtain the set S of ground-truthed RF signals for each of a plurality of locations $L(i)$, the processor being structured to compute RF propagation from a plurality of identified telecommunications equipment sites $T(x)$ based on at least distance and terrain to provide a predictive model for the plurality of locations $L(i)$, the computed predictive model comprising a set of predicted RF propagation values $P(T(x), L(i))$, and to correlate the set S of ground-truthed RF signals for location $L(i)$ with the set of predicted RF propagation values $P(T(x), L(i))$ to deduce which of the plurality of identified telecommunications equipment sites $T(x)$ is likely to have transmitted the measured RF signals.

* * * * *